United States Patent
Kwon et al.

(10) Patent No.: US 10,586,652 B1
(45) Date of Patent: Mar. 10, 2020

(54) MULTILAYER CERAMIC CAPACITOR

(71) Applicant: SAMSUNG ELECTRO-MECHANICS CO., LTD., Suwon-si, Gyeonggi-do (KR)

(72) Inventors: Hyung Soon Kwon, Suwon-si (KR); Kyoung Jin Cha, Suwon-si (KR); Ji Hong Jo, Suwon-si (KR)

(73) Assignee: SAMSUNG ELECTRO-MECHANICS CO., LTD., Suwon-si, Gyeonggi (KR)

( * ) Notice: Subject to any disclaimer, the term of this patent is extended or adjusted under 35 U.S.C. 154(b) by 0 days.

(21) Appl. No.: 16/209,592

(22) Filed: Dec. 4, 2018

(30) Foreign Application Priority Data

Oct. 2, 2018 (KR) .................. 10-2018-0117768

(51) Int. Cl.
*H01G 4/224* (2006.01)
*H01G 4/30* (2006.01)
(Continued)

(52) U.S. Cl.
CPC .......... *H01G 4/224* (2013.01); *H01G 4/2325* (2013.01); *H01G 4/248* (2013.01); *H01G 4/30* (2013.01); *H01G 4/012* (2013.01); *H01G 4/1227* (2013.01)

(58) Field of Classification Search
CPC ........ H01G 4/012; H01G 4/1227; H01G 4/33; H01G 4/248; H01G 4/224; H01G 4/2325; H01G 4/30
(Continued)

(56) References Cited

U.S. PATENT DOCUMENTS

2007/0015336 A1* 1/2007 Farahmandi .......... H01G 9/155
438/396
2014/0022692 A1 1/2014 Yoon et al.
(Continued)

FOREIGN PATENT DOCUMENTS

JP 2010-103566 A 5/2010
JP 2017-011172 A 1/2017
(Continued)

OTHER PUBLICATIONS

Korean Office Action dated Sep. 6, 2019 issued in Korean Patent Application No. 10-2018-0117768 (with English translation).

*Primary Examiner* — Michael P McFadden
(74) *Attorney, Agent, or Firm* — Morgan, Lewis & Bockius LLP

(57) ABSTRACT

A multilayer ceramic capacitor includes a ceramic body including dielectric layers and first and second internal electrodes disposed to face each other with each of the dielectric layers interposed therebetween, and first and second external electrodes disposed on external surfaces of the ceramic body and electrically connected to the first and second internal electrodes, respectively. The ceramic body includes an active portion in which capacitance is formed and cover portions disposed above and below the active portion. Each of the cover portions includes a first region adjacent to an external side surface of the ceramic body and a second region adjacent to an outermost internal electrode and disposed between the first region and the active region. A density of a dielectric material included in the second region is higher than a density of a dielectric material included in the first region.

9 Claims, 2 Drawing Sheets

(51) Int. Cl.
 *H01G 4/232* (2006.01)
 *H01G 4/248* (2006.01)
 *H01G 4/012* (2006.01)
 *H01G 4/12* (2006.01)

(58) Field of Classification Search
 USPC .................................................... 361/301.4
 See application file for complete search history.

(56) References Cited

U.S. PATENT DOCUMENTS

| | | |
|---|---|---|
| 2014/0311783 A1 | 10/2014 | Lee et al. |
| 2015/0348712 A1* | 12/2015 | Lee .................. H01G 4/30 |
| | | 174/260 |
| 2016/0196918 A1* | 7/2016 | Hong ............... H01G 4/0085 |
| | | 174/260 |
| 2016/0284471 A1* | 9/2016 | Mizuno ............. H01G 4/30 |
| 2018/0174755 A1 | 6/2018 | Kim et al. |

FOREIGN PATENT DOCUMENTS

| | | |
|---|---|---|
| KR | 10-2014-0012493 A | 2/2014 |
| KR | 10-2014-0124657 A | 10/2014 |
| KR | 10-2018-0071842 A | 6/2018 |

* cited by examiner

I-I'

MULTILAYER CERAMIC CAPACITOR

CROSS-REFERENCE TO RELATED APPLICATION(S)

This application claims the benefit of priority to Korean Patent Application No. 10-2018-0117768 filed on Oct. 2, 2018 in the Korean Intellectual Property Office, the disclosure of which is incorporated herein by reference in its entirety.

TECHNICAL FIELD

The present disclosure relates to a multilayer ceramic capacitor having improved reliability.

BACKGROUND

Generally, electronic components using a ceramic material, such as a capacitor, an inductor, a piezoelectric element, a varistor, a thermistor, and the like, include a ceramic body formed of the ceramic material, internal electrodes disposed in the ceramic body, and external electrodes disposed on surfaces of the ceramic body to be connected to the internal electrodes.

Recently, in accordance with the miniaturization and multifunctionalization of electronic products, multilayer ceramic electronic components have also tended to be miniaturized and multifunctionalized. Therefore, a multilayer ceramic capacitor having a small size and high capacitance has been demanded.

Currently, a thickness of the dielectric layer is about 0.5 micrometer (μm), and technology for thinning the dielectric layer is continuously being developed.

In addition to the thinning of the dielectric layer, it has become important to secure characteristics of multilayer ceramic capacitors, such as high-temperature load reliability, aging characteristics, DC-bias characteristics, and humidity resistance characteristics.

In detail, the humidity resistance characteristics are becoming important because humidity penetration affects defects and reliability degradation of a multilayer ceramic capacitor.

SUMMARY

An aspect of the present disclosure is to provide a multilayer ceramic capacitor having improved reliability.

According to an aspect of the present disclosure, a multilayer ceramic capacitor includes a ceramic body including dielectric layers and first and second internal electrodes disposed to face each other with each of the dielectric layers interposed therebetween, the ceramic body having first and second surfaces opposing each other, third and fourth surfaces connecting the first and second surfaces and opposing each other, and fifth and sixth surfaces connecting the first to fourth surfaces and opposing each other, and first and second external electrodes disposed on external surfaces of the ceramic body and electrically connected to the first and second internal electrodes, respectively. The ceramic body includes an active portion including the first and second internal electrodes disposed with each of the dielectric layers interposed therebetween, and cover portions disposed above and below the active portion. Each of the cover portions includes a first region adjacent to an external side surface of the ceramic body and a second region adjacent to an outermost internal electrode among the first and second internal electrodes and disposed between the first region and the active region, and a density of a dielectric material included in the second region is higher than a density of a dielectric material included in the first region.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary embodiments in the present disclosure will be described in detail with reference to the accompanying drawings.

Figure 1:
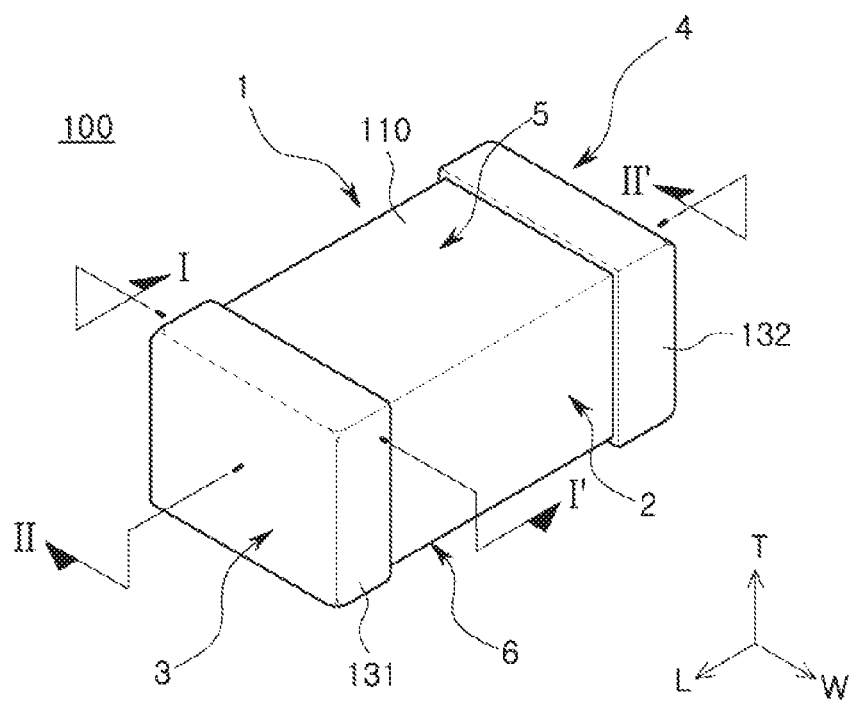
FIG. 1 is a perspective view of a multilayer ceramic capacitor according to an exemplary embodiment in the present disclosure.
Figure 2:
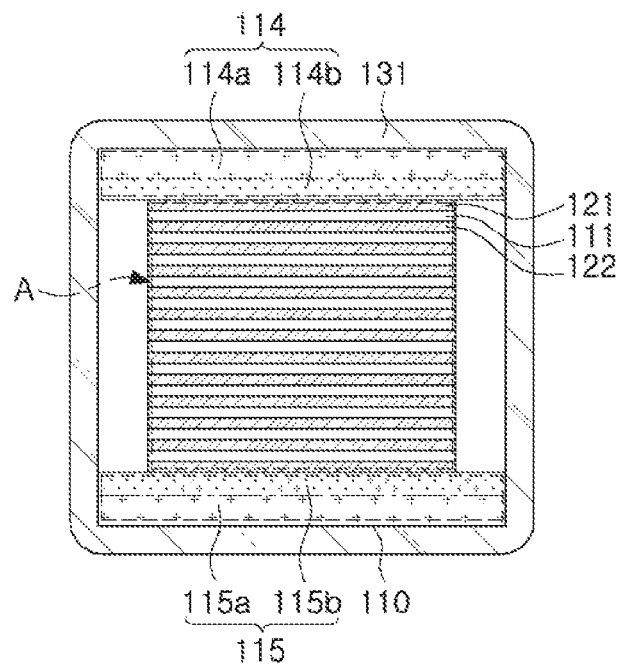
FIG. 2 is a cross-sectional view taken along line I-I' in FIG. 1.
Figure 3:
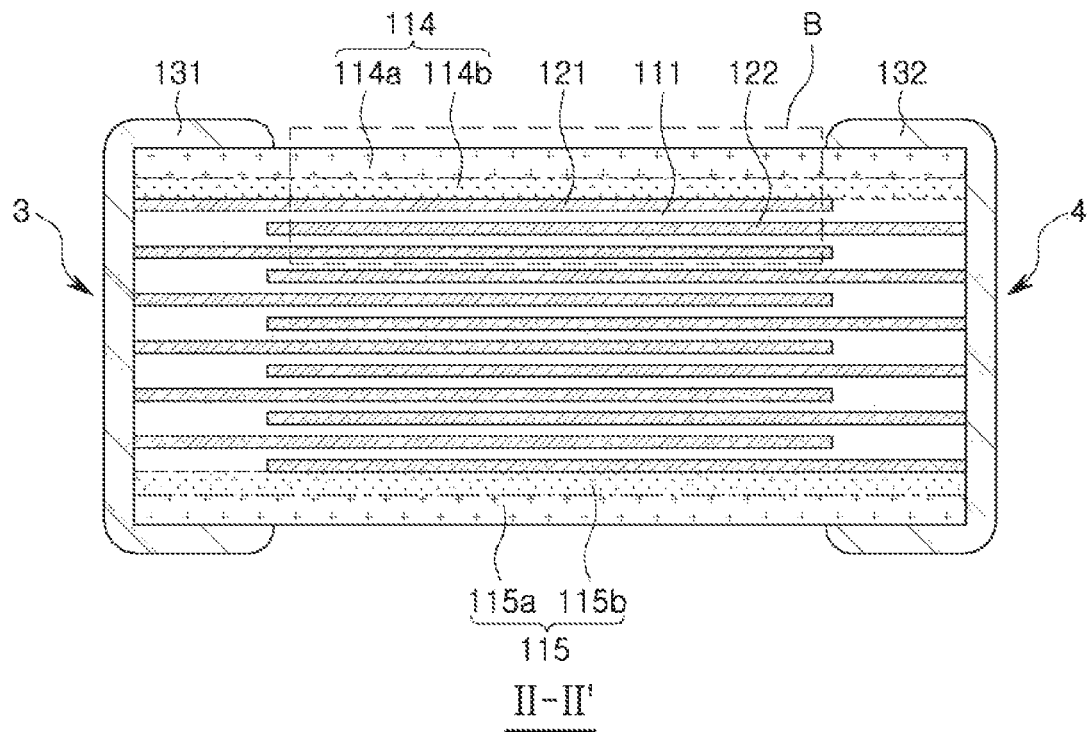
FIG. 3 is a cross-sectional view taken along line II-II' in FIG. 1.
Figure 4:
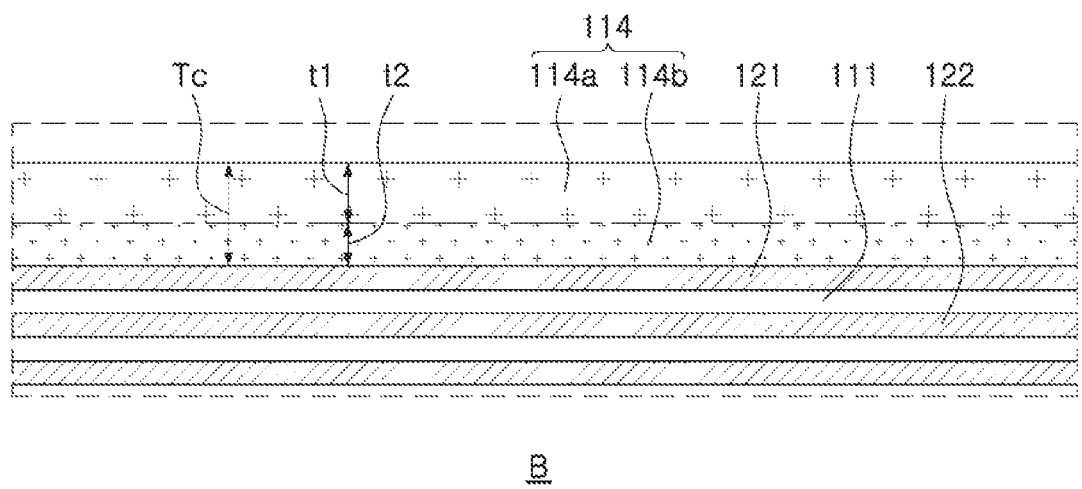
FIG. 4 is an enlarged view of region 'B' in FIG. 3.

FIG. 1 is a perspective view of a multilayer ceramic capacitor according to an exemplary embodiment in the present disclosure. FIG. 2 is a cross-sectional view taken along line I-I' in FIG. 1, and FIG. 3 is a cross-sectional view taken along line II-II' in FIG. 1. FIG. 4 is an enlarged view of region 'B' in FIG. 3.

Referring to FIGS. 1 to 4, a multilayer ceramic capacitor 100 according to an exemplary embodiment may include a ceramic body 110, a plurality of first and second internal electrodes 121 and 122 disposed in the ceramic body 110, and first and second external electrodes 131 and 132 disposed on external surfaces of the ceramic body 110.

The ceramic body 110 may have a first surface 1 and a second surface 2 disposed to oppose to each other, a third surface 3 and a fourth surface 4 disposed to connect the first surface 1 and the second surface 2, and a fifth surface 5 and a sixth surface 6 that are a top surface and a bottom surface, respectively.

The first and second surfaces 1 and 2 may be defined as surfaces opposing in a width direction W of the ceramic body 110, the third and fourth surfaces 3 and 4 may be defined as surfaces opposing in a length direction L of the ceramic body 110, and the fifth and sixth surfaces 5 and 6 may be defined as surfaces opposing in a thickness direction T of the ceramic body 110.

A shape of the ceramic body 110 is not limited, but may be a rectangular parallelepiped shape as illustrated.

One ends of the plurality of internal electrodes 121 and 122 disposed in the ceramic body 110 are exposed to the third surface 3 or the fourth surface 4 of the ceramic body 110.

The internal electrodes 121 and 122 may include a pair of first and second internal electrodes 121 and 122 having polarities different from each other.

One end of the first internal electrode 121 may be exposed to the third surface 3, and one end of the second internal electrode 122 may be exposed to the fourth surface 4.

The other end of the first internal electrode 121 is spaced apart from the fourth surface 4 at a predetermined distance.

The other end of the second internal electrode 122 is spaced apart from the third surface 3 at a predetermined distance.

The first and second external electrodes 131 and 132 may be disposed on the third and fourth surfaces 3 and 4 of the ceramic body 110, respectively, and may be electrically connected to the internal electrodes.

In an exemplary embodiment, a raw material for forming the dielectric layer 111 is not limited as long as sufficient capacitance may be obtained. For example, the raw material of the dielectric layer 111 may be barium titanate ($BaTiO_3$) powder particles.

The raw material for forming the dielectric layer 111 may be prepared by adding various ceramic additives, organic solvents, plasticizers, binders, dispersants, and the like, to powder particles such as the barium titanate ($BaTiO_3$) powder particles, or the like, according to an object of the present disclosure.

The dielectric layers 111 may be in a sintered state, and adjacent dielectric layers may be integrated with each other so that boundaries therebetween may not be readily apparent.

The ceramic body 110 has a length corresponding to a distance from the third surface 3 to the fourth surface 4.

The length of the dielectric layer 111 forms a distance between the third surface 3 and the fourth surface 4.

According to an exemplary embodiment, the length of the ceramic body 110 may range from 400 to 1400 micrometers ($\mu m$), but is not limited thereto. In more detail, the length of the ceramic body 110 may range from 400 to 800 $\mu m$ or from 600 to 1400 $\mu m$.

The internal electrodes 121 and 122 may be disposed on the dielectric layer 111. The internal dielectric layers 121 and 122 may be disposed in the ceramic body 110 with a dielectric layer interposed therebetween by sintering.

Referring to FIG. 3, the first internal electrode 121 is disposed on the dielectric layer 111. The first internal electrode 121 is not entirely disposed with respect to a length direction of the dielectric layer 111. For example, one end of the first internal electrode 121 is disposed up to the third surface 3 of the ceramic body 110 to be exposed to the third surface 3, and the other end of the first internal electrode 121 may be spaced apart from the fourth surface 4 by a predetermined interval.

An end portion of the first internal electrode 121 exposed to the third surface 3 of the ceramic body 110 is connected to the first external electrode 131.

In contrast to the first internal electrode 121, one end of the second internal electrode 122 is exposed to the fourth surface 4 to be connected to the second external electrode 132 and the other end of the second internal electrode 122 is spaced apart from the third surface 3 at a predetermined interval.

A material for forming the first and second internal electrodes 121 and 122 is not limited. For example, the first and second internal electrodes 121 and 122 may be formed using a conductive paste including at least one of copper (Cu), silver (Ag), nickel (Ni), and alloys thereof.

The first and second external electrodes 131 and 132 may be electrically connected to each other to form capacitance. The second external electrode 132 may be connected to a potential different from a potential to which the first external electrode 131 is connected.

The multilayer ceramic capacitor 100 according to an exemplary embodiment includes an active portion A disposed in the ceramic body 110 to form capacitance and including the first and second internal electrodes 121 and 122 disposed with the dielectric layer 111 interposed therebetween and cover portions 114 and 115 disposed above and below the active portion A.

The active portion A contribute to formation of capacitance and may be formed by repeatedly laminating the plurality of first and second internal electrodes 121 and 122 with the dielectric layers 111 interposed therebetween.

The cover portions 114 and 115 include a top cover portion 114 disposed above the active portion A and a bottom cover portion 115 disposed below the active portion A. The top and bottom cover portions 114 and 115 may have the same material and configuration as the dielectric layer 111, except that internal electrodes are included therein.

For example, the top cover portion 114 and the bottom cover portion 115 may include a ceramic material such as a barium titanate ($BaTiO_3$)-based ceramic material.

The top cover portion 114 and the bottom cover portion 115 may be formed by vertically laminating a single dielectric layer or two or more dielectric layers on top and bottom surfaces of the active portion A, and may basically serve to prevent the internal electrodes 121 and 122 from being damaged by physical or chemical stress.

According to an exemplary embodiment, the cover portions 114 and 115 are divided into first regions 114a and 115a adjacent to an external side surface of the ceramic body 110 and second regions 114b and 115b adjacent to an outermost internal electrode among the first and second internal electrodes 121 and 122. A dielectric material included in the second regions 114b and 115b has a density higher than a density of a dielectric material included in the first regions 114a and 115a.

Recently, in accordance with the miniaturization and multifunctionalization of electronic products, multilayer ceramic electronic components have also tended to be miniaturized and multifunctionalized. Therefore, a multilayer ceramic capacitor having a small size and high capacitance has been demanded.

As electronic components have been miniaturized, a dielectric layer has also been thinned. As a dielectric layer has been thinned, it has become important to secure characteristics of multilayer ceramic capacitors, such as high-temperature load reliability, aging characteristics, DC-bias characteristics, and humidity resistance characteristics.

In detail, the humidity resistance characteristics are becoming important because humidity penetration affects defects and reliability degradation of a multilayer ceramic capacitor.

According to an exemplary embodiment, the cover portions 114 and 115 are divided into first regions 114a and 115a adjacent to an external side surface of the ceramic body 110 and second regions 114b and 115b adjacent to an outermost internal electrode among the first and second internal electrodes 114a and 115a. A density of a dielectric material included in the second regions 114b and 115b may be adjusted to be higher than a density of a dielectric material included in the first regions 114a and 115a. Thus, sintering mismatch may be reduced to improve reliability.

In general, when compactness of a cover portion is lower than that of an active portion, a defect such as cracking or the like caused by sintering mismatch may occur.

According to an exemplary embodiment, a density of a dielectric material of the second regions 114b and 115b adjacent to an outermost internal electrode among the first and second internal electrodes 121 and 122 may be adjusted to be relatively higher than a density of a dielectric material of the first regions 114a and 115a. Thus, the density of a dielectric material of the second regions 114b and 115b may be adjusted to be similar to, or the same as, a density of a dielectric material of the active portion A to reduce sintering mismatch.

In addition, since the density of the dielectric material of the second regions 114b and 115b is controlled to be higher than the density of the dielectric material of the first regions 114a and 115a, the density of the dielectric material of the second regions 114b and 115b is relatively high, and thus humidity resistance reliability may be improved.

On the other hand, a density of a dielectric material of the first regions 114a and 115a adjacent to an external electrode is relatively lower than the density of the dielectric material of the second regions 114b and 115b, and thus adhesion to the external electrode may be enhanced.

According to an exemplary embodiment, when a thickness of each of the cover portions 114 and 115 is defined as tc and a thickness of each of the second regions 114b and 115b is defined as t2, a ratio of t2 to tc (t2/tc) may satisfy t2/tc≤0.5.

A density of a dielectric layer of the second regions 114b and 115b is higher than a density of a dielectric material of the first regions 114a and 115a. To reduce sintering mismatch and secure humidity resistance reliability, a ratio of the thickness of each of the second regions 114b and 115b to the thickness tc of each of the cover portions 114 and 115 have only to be less than or equal to 0.5.

When a thickness of each of the first regions 114a and 115a is defined as t1, a ratio of t1 to tc (t1/tc) may satisfy t1/tc≥0.5.

A density of a dielectric layer of the first regions 114a and 115a is lower than a density of a dielectric material of the second regions 11ba and 115b. To secure adhesion to an external electrode, a ratio of the thickness of each of the first regions 114a and 115a to the thickness tc of each of the cover portions 114 and 115 have only to be less than or equal to 0.5.

The top cover portion 114 and the bottom cover portion 115 may include a base material main ingredient including barium (Ba) and titanium (Ti), similarly to the dielectric layer 111 of the active portion A.

The base material main ingredient includes $BaTiO_3$ or a main ingredient represented by $(Ba,Ca)(Ti,Ca)O_3$, $(Ba,Ca)(Ti,Zr)O_3$, $Ba(Ti,Zr)O_3$, or $(Ba,Ca)(Ti,Sn)O_3$ in which calcium (Ca), zirconium (Zr), tin (Sn), or the like, is partially solid-dissolved. The base material main ingredient may be included in a powder form.

The top cover portion 114 and the lower cover portion 115 may include a first accessory ingredient including at least one of vanadium (V), chromium (Cr), iron (Fe), nickel (Ni), cobalt (Co), copper (Cu), and zinc (Zn), as an accessory ingredient.

The top cover portion 114 and the lower cover portion 115 may further include a second accessory ingredient including at least one of Ba and Ca, a third accessory ingredient including an oxide or a carbonate containing silicon (Si), or a glass compound containing Si, a fourth accessory ingredient including at least one of yttrium (Y), dysprosium (Dy), holmium (Ho), erbium (Er), gadolinium (Gd), cesium (Ce), neodymium (Nd), samarium (Sm), lanthanum (La), terbium (Tb), ytterbium (Yb), and praseodymium (Pr), and a fifth accessory ingredient including magnesium (Mg) or aluminum (Al).

The multilayer ceramic capacitor 100 according to an exemplary embodiment is a subminiature and high-capacitance product and is characterized in that the dielectric layer 111 has at thickness of 0.4 micrometer (μm) or less, each of the first and second internal electrodes 121 and 122 has a thickness of 0.4 μm or less, but the features thereof are not limited thereto.

For example, since the multilayer ceramic capacitor 100 according to an exemplary embodiment is a subminiature and high-capacitance product, each of the dielectric layer 111 and the first and second internal electrodes 121 and 122 is provided as a thin film having a thickness smaller than that of a related-art product. In the case of a product to which a thin dielectric layer and thin internal electrodes are applied, controlling compactness of a dielectric material of a cover portion is a significantly important issue for implementation of target capacitance and improvement of reliability.

For example, since a related-art multilayer ceramic capacitor includes a dielectric layer and an internal electrode having thicknesses greater than thicknesses of a dielectric layer and an internal electrode included in a multilayer ceramic capacitor according to the present embodiment, there is no significant problem even if compactness of a dielectric material of a cover portion is not adjusted.

However, in the case of a product to which a thin dielectric layer and a thin internal electrode are applied, compactness of a dielectric material of a cover portion should be adjusted.

For example, in an exemplary embodiment, a density of a dielectric material of the second regions 114b and 115b of the cover portions 114 and 115 adjacent to an outermost internal electrode among the first and second internal electrodes 121 and 122 may be adjusted to be relatively high, compared to the first regions 114a and 115a. Thus, sintering mismatch may be reduced even in the case in which each of the dielectric layer 111 and the first and second internal electrodes 121 and 122 has a thickness of 0.4 μm or less.

In addition, since the density of the dielectric material of the second regions 114b and 115b is controlled to be higher than the density of the dielectric material of the first regions 114a and 115a, the density of the dielectric material of the second regions 114b and 115b is relatively high even when each of the dielectric layer 111 and the first and second internal electrodes 121 and 122 is provided as a thin film having a thickness of 0.4 μm or less. Thus, humidity resistance reliability may be improved.

On the other hand, since the density of the dielectric material of the first regions 114a and 115a is relatively lower than the density of the dielectric material of the first and second regions 114b and 115b, adhesion to an external electrode may be improved even when each of the dielectric layer 111 and the first and second internal electrodes 121 and 122 is provided as a thin film having a thickness of 0.4 μm or less.

The term 'thin film' does not mean that each of the dielectric layer 111 and the first and second internal electrodes 121 and 122 has a thickness of 0.4 μm or less and will be appreciated as a concept in which each of a dielectric layer and internal electrodes has a thickness smaller than that in a related-art product.

According to an exemplary embodiment, an average particle diameter of dielectric grains included in the second regions 114b and 115b may be greater than an average particle diameter of dielectric grains included in the first regions 114a and 115a.

Since grain growth and densification occur concurrently during sintering, the grain growth is significantly increased as compactness is increased. Thus, particle sizes are also increased.

Meanwhile, the grain growth is decreased when compactness is low. Thus, particle sizes are also decreased.

Accordingly, an average particle diameter of dielectric grains included in the second regions 114b and 115b having a relatively high density of a dielectric material is greater than an average particle diameter of dielectric grains included in the first regions 114a and 115a.

Accordingly, effects such as reduction of sintering mismatch and improvement of humidity resistance reliability may be obtained and adhesive to an external electrode may be improved. As a result, a multilayer ceramic capacitor having improved reliability may be implemented.

According to an exemplary embodiment, the dielectric grains included in the cover portions 114 and 115 may contain sodium (Na), lithium, and boron (B).

Contents of Na, Li, and B contained in the second regions 114b and 115b of the cover portions 114 and 115 may be higher than contents of Na, Li, and B contained in the first regions 114a and 115a.

The contents of Na, Li, and B contained in the second regions 114b and 115b of the cover portions 114 and 115 may be adjusted to be higher than the contents of Na, Li, and B contained in the first regions 114a and 115a. Thus, compactness of the second regions 114b and 115b of the cover portions 114 and 115 may be increased to improve humidity resistance characteristics.

In detail, the contents of Na, Li, and B contained in the first regions 114a and 115a of the cover portions 114 and 115 adjacent to the external side surface of the ceramic body 110 may be adjusted to be relatively low. Thus, adhesion to the first external electrode 131 and the second external electrode 132 may be improved.

Hereinafter, a method of manufacturing a multilayer ceramic capacitor according to an exemplary embodiment will be described, but is not limited thereto.

In the method of manufacturing a multilayer ceramic electronic component according to an exemplary embodiment, slurry including powder particles such as barium titanate ($BaTiO_3$) powder particles, or the like, may be first applied onto carrier films and dried to prepare a plurality of ceramic green sheets, resulting in formation of dielectric layers.

The ceramic green sheet may be manufactured by preparing slurry by mixing ceramic powder particles, a binder, and a solvent with one another and manufacturing the slurry in a sheet shape having a thickness of several μm by a doctor blade method.

The ceramic powder may include $BaTiO_3$ or a main ingredient represented by $(Ba,Ca)(Ti,Ca)O_3$, $(Ba,Ca)(Ti,Zr)O_3$, $Ba(Ti,Zr)O_3$, or $(Ba,Ca)(Ti,Sn)O_3$ in which calcium (Ca), zirconium (Zr), tin (Sn), or the like, is partially solid-dissolved. The base material main ingredient may be included in a powder form.

The ceramic powder may include sodium (Na), lithium (Li), and boron (B) as accessory ingredients, and contents of sodium (Na), lithium (Li), and boron (B) may exceed 0 mol and be 1.0 mol or less based on titanium (Ti).

Next, a conductive paste for an internal electrode including 40 to 50 parts by weight of nickel powder particles having an average particle size of 0.1 to 0.2 μm may be prepared.

The conductive paste for an internal electrode was applied onto ceramic green sheets by a screen printing method to form internal electrodes, and the ceramic green sheets on which internal electrode patterns are disposed were laminated to form the ceramic body 110.

External electrodes including a conductive metal and a glass may be formed on the external surfaces of the ceramic body 110.

The conductive metal is not limited, but may be, for example, one or more selected from the group consisting of copper (Cu), silver (Ag), nickel (Ni), and alloys thereof.

The glass is not limited, but may be a material having the same composition as a glass used to manufacture an external electrode of a typical multilayer ceramic capacitor.

The external electrodes may be formed on the external surfaces of the ceramic body to be electrically connected to the first and second internal electrodes, respectively.

A plating layer may be formed respectively on the first and second external electrodes.

The plating layer is not limited, but may include, for example, one or more selected from the group consisting of nickel (Ni), tin (Sn), and alloys thereof.

As described above so far, cover portions are divided into a first region adjacent to an external side surface of a ceramic body and a second region adjacent to an outermost internal electrode among first and second internal electrodes. A density of a dielectric material included in the second region is controlled to be higher than a density of a dielectric material included in the first region. Thus, sintering mismatch may be reduced to improve reliability.

Since the density of a dielectric material included in the second region is controlled to be higher than the density of a dielectric material included in the second region, compactness of the second region is relatively high while compactness of the first region is relatively low. Thus, humidity resistance reliability may be improved, and adhesion to an external may be improved.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
a ceramic body including dielectric layers and first and second internal electrodes disposed to face each other with each of the dielectric layers interposed therebetween, ceramic body having first and second surfaces opposing each other, third and fourth surfaces connecting the first and second surfaces and opposing each other, and fifth and sixth surfaces connecting the first to fourth surfaces and opposing each other; and
first and second external electrodes disposed on external surfaces of the ceramic body and electrically connected to the first and second internal electrodes, respectively,
wherein the ceramic body includes an active portion including the first and second internal electrodes disposed with each of the dielectric layers interposed therebetween, and cover portions disposed above and below the active portion,
each of the cover portions includes a first region adjacent to an external side surface of the ceramic body, and a second region adjacent to an outermost internal electrode among the first and second internal electrodes and disposed between the first region and the active region,
a density of a dielectric material included in the second region is higher than a density of a dielectric material included in the first region, and
an average particle diameter of dielectric grains included in the second region is greater than an average particle diameter of dielectric grains included in the first region.

2. The multilayer ceramic capacitor of claim 1, wherein each of the dielectric layers has a thickness of 0.4 micrometer or less, and each of the first and second internal electrodes has a thickness of 0.4 micrometer or less.

3. The multilayer ceramic capacitor of claim 1, wherein a ratio of t2 to tc satisfies t2/tc≤0.5, in which tc is a thickness of each of the cover portions and t2 is a thickness of the second region.

4. The multilayer ceramic capacitor of claim 1, wherein a ratio of t1 to tc satisfies t1/tc≥0.5, in which tc is a thickness of each of the cover portions and t1 is a thickness of the first region.

5. The multilayer ceramic capacitor of claim 1, wherein the cover portions include dielectric grains containing sodium (Na), lithium (Li), and boron (B).

6. The multilayer ceramic capacitor of claim 5, wherein contents of Na, Li, and B included in the second region of the cover portions are higher than contents of Na, Li, and B included in the first region of the cover portions.

7. The multilayer ceramic capacitor of claim 1, wherein the density of the dielectric material included in the second region is the same as a density of a dielectric material included in the active region.

8. A multilayer ceramic capacitor comprising:
a ceramic body including dielectric layers and first and second internal electrodes disposed to face each other with each of the dielectric layers interposed therebetween, ceramic body having first and second surfaces opposing each other, third and fourth surfaces connecting the first and second surfaces and opposing each other, and fifth and sixth surfaces connecting the first to fourth surfaces and opposing each other; and
first and second external electrodes disposed on external surfaces of the ceramic body and electrically connected to the first and second internal electrodes, respectively,
wherein the ceramic body includes an active portion including the first and second internal electrodes disposed with each of the dielectric layers interposed therebetween, and cover portions disposed above and below the active portion,
each of the cover portions includes a first region adjacent to an external side surface of the ceramic body, and a second region adjacent to an outermost internal electrode among the first and second internal electrodes and disposed between the first region and the active region,
a density of a dielectric material included in the second region is higher than a density of a dielectric material included in the first region,
the cover portions include dielectric grains containing sodium (Na), lithium (Li), and boron (B), and
contents of Na, Li, and B included in the second region of the cover portions are higher than contents of Na, Li, and B included in the first region of the cover portions.

9. A multilayer ceramic capacitor comprising:
a ceramic body including dielectric layers and first and second internal electrodes disposed to face each other with each of the dielectric layers interposed therebetween, ceramic body having first and second surfaces opposing each other, third and fourth surfaces connecting the first and second surfaces and opposing each other, and fifth and sixth surfaces connecting the first to fourth surfaces and opposing each other; and
first and second external electrodes disposed on external surfaces of the ceramic body and electrically connected to the first and second internal electrodes, respectively,
wherein the ceramic body includes an active portion including the first and second internal electrodes disposed with each of the dielectric layers interposed therebetween, and cover portions disposed above and below the active portion,
each of the cover portions includes a first region adjacent to an external side surface of the ceramic body, and a second region adjacent to an outermost internal electrode among the first and second internal electrodes and disposed between the first region and the active region,
a density of a dielectric material included in the second region is higher than a density of a dielectric material included in the first region, and
the density of the dielectric material included in the second region is the same as a density of a dielectric material included in the active region.

* * * * *